United States Patent [19]

Euber et al.

[11] Patent Number: 4,990,344

[45] Date of Patent: Feb. 5, 1991

[54] METHOD FOR MAKING SOLUBLE RICE PROTEIN CONCENTRATE AND THE PRODUCT PRODUCED THEREFROM

[75] Inventors: John R. Euber, Evansville; Gabor Puski, Newburgh; Grant H. Hartman, Jr., Evansville, all of Ind.

[73] Assignee: Bristol-Myers Company, New York, N.Y.

[21] Appl. No.: 377,978

[22] Filed: Jul. 11, 1989

[51] Int. Cl.[5] .............................................. A23C 11/00
[52] U.S. Cl. ........................................ 426/28; 426/44; 426/656; 426/801
[58] Field of Search .................. 426/201, 656, 28, 29, 426/44

[56] References Cited

U.S. PATENT DOCUMENTS

| | | |
|---|---|---|
| 4,744,992 | 5/1988 | Mitchell et al. |
| 4,756,912 | 7/1988 | Mitchell et al. |
| 4,876,096 | 10/1989 | Mitchell ............................ 426/28 |
| 4,894,242 | 1/1990 | Mitchell ............................ 426/29 |

OTHER PUBLICATIONS

Hansen, et al., *Food Technology*, 35, (No. 11) 38-42 (1981).
Chen et al., *J. Sci. Food Agric.*, 35, 1128-1135 (1984).
Chang, et al., *Journal of Food Science*, 51, (No. 2) 464-467 (1986).
Griffin, et al., *Journal of Food Science*, 54 (No. 1) 190-193 (1989).
Lonnerdal, et al., *Am. J. Clin. Nutr.*, 48 1301-1306 (1988).

*Primary Examiner*—Carolyn Paden
*Attorney, Agent, or Firm*—Robert H. Uloth

[57] ABSTRACT

This invention concerns a process for preparing soluble rice protein concentrate with reduced levels of manganese, aluminum, selenium and phytic acid and improved digestibility from rice raw material comprising:

digesting the raw material reduced in particle size to permit efficient enzyme action in an aqueous medium with an alpha-amylase enzyme at an operable pH and temperature for a period of time sufficient to solubilize a substantial portion of the rice starch and form a liquid slurry;

heating the rice starch slurry at 105° C. to 130° C. for 30 to 60 seconds;

separating the high protein rice flour from the rice syrup;

treating a slurry of the high protein rice flour with a protease enzyme at an operable pH and temperature in an amount and for a period of time to solubilize the rice protein:

clarifying the protease treated slurry to provide a soluble rice protein concentrate with reduced manganese, aluminum, selenium and phytic acid and improved digestibility.

The soluble rice protein concentrate contains more the 16% protein on a solids basis, and has on a per gram protein basis, a manganese content of 50 microgram or less, an aluminum content of less than 15 microgram, a selenium content reduces a minimum of 25% relative to rice raw material and a phytic acid content of less than 15 mg, and a protein digestibility of greater than 90%.

22 Claims, 1 Drawing Sheet

FIG. 1

BLOCK DIAGRAM OF THE INVENTION PROCESS

METHOD FOR MAKING SOLUBLE RICE PROTEIN CONCENTRATE AND THE PRODUCT PRODUCED THEREFROM

FIELD OF THE INVENTION

The present invention relates to rice-based food compositions and to methods of preparation. More particularly, the present invention relates to soluble rice protein concentrate and use in nutritionally complete infant formula. In its methods aspect, the present invention relates to a process for preparing soluble rice protein concentrate suitable for use in rice-based infant formula.

BACKGROUND OF THE INVENTION

Rice is a high starch, low protein grain that is a staple item of diet for many parts of the world. Rice is composed of about 80% carbohydrate with about 6–10% protein. The rice protein has a relatively high PER (protein efficiency ratio—ratio of weight gain of rats to protein consumed) of about 2.18 which is almost equivalent to that of beef (2.30), a considerably more costly protein source. However, because of the sheer bulk involved, children and infants cannot eat a sufficient amount of rice to meet daily protein requirements. Moreover, rice protein is insoluble which makes feeding rice-based formula to young infants difficult.

Efforts to improve the protein level in rice involving selective breeding of new rice varieties have increased protein levels somewhat but not to the extent of providing strains with protein levels suitable for use in rice-based infant formula. Another approach has been to increase the protein content of rice flour by gelatinizing and enzymatically digesting rice starch with carbohydrate degrading enzyme commonly known as amylases. This treatment hydrolyzes the starch to soluble saccharides of various molecular weights such as glucose, maltose, oligosaccharides, and dextrins from which the insoluble protein-enriched rice flour is separated, for example by centrifugation. Thus, by partial removal of solubilized carbohydrate, the protein content of the processed rice flour is correspondingly enhanced to provide what is referred to herein as high protein rice flour (HPRF). Prior art within this general area includes the following papers.

Hansen, et al., *Food Technology*, 35 (No. 11), pages 38–42 (1981) developed a high protein rice flour (25% protein content) by using the enzyme alpha-amylase to digest the starch material of milled broken rice thereby decreasing starch content resulting in increased protein content compared to the original rice flour. In the Hansen, et al. process, a 5% slurry of finely ground crude rice flour is first heated for 30 min. at 100° C. to effect gelatinization, then partially digested by enzyme (alpha-amylase) treatment, centrifuged and the insoluble HPRF freeze-dried. Protein level of HPRF was reportedly increased three-fold over the starting material (approximately from about 8% to 25%). The supernatant is principally carbohydrate (98.3%).

Chen, et al., *J. Sci. Food Agric.* 35, 1128–1135 (1984) modified the Hansen et al. process to provide both HPRF and high-fructose rice syrup from broken rice. In the Chen, et al. process, a 20% slurry of the milled broken rice is mixed with calcium chloride (70 mg/kg rice), pH adjusted to 6.5 and digested (liquified) with alpha-amylase optimally at 90° C. for 90 minutes. Specifically, Termamyl 60L alpha-amylase obtained from Novo Industri, A/S, Denmark, is employed. The liquified mixture is centrifuged and the insoluble HPRF dried. Protein content of the HPRF was similar to Hansen, et al. (approximately three times as high as the raw material). The supernatant is saccharified at 60° C. with glucoamylase and then isomerized to fructose with glucose isomerase to provide a high-fructose rice syrup containing 50% glucose, 42% fructose and 3% maltose.

Chang, et al., *Journal of Food Science*, 51 (No. 2), pages 464–467 (1986) further modified the Hansen, et al. process to produce a rice flour with increased protein and calcium contents. According to Chang, et al., processing conditions for the production of HPRF concerned treating gelatinized rice flour slurry with calcium chloride and alpha-amylase at 60° C. for 90 min. The hydrolyzed starch is removed by centrifugation and the insoluble paste freeze dried to yield high protein rice flour with approximately 38% protein, a PER ratio of 2.17 and an amino acid composition similar to the rice flour of Hansen, et al.

The enzymatic hydrolysis of rice starch has also been investigated in connection with developing rice syrup sweetener and rice-milk as noted in the following publication and Mitchell, et al. patents.

Griffin, et al., *Journal of Food Science*, 54 (No. 1), pages 190–193 (1988) studied processing modifications required to provide high yields of liquified rice starch from milled rice using heat-stable alpha-amylase and a starting solids content of 30% with the conclusion that rice maltodextrins could be most effectively produced at a processing temperature of 80° C.

Mitchell, et al., U.S. Pat. No. 4,744,992 describes the production of a nutritional rice milk product obtained by liquifying whole grain rice particles with alpha-amylase enzyme followed by saccharification with a glucosidase enzyme. The process does not enhance protein content and minerals found in the whole grain rice are retained.

Mitchell, et al., in a related patent (U.S. Pat. No. 4,756,912) partially clarified the saccharification product of U.S. Pat. No. 4,744,992 to remove substantially all rice fiber while leaving substantial portions of all other nutritional components to produce a rice syrup sweetener.

High protein rice flour obtained as described in the prior art has not proved to be satisfactory with respect to use in infant formula. Over 80% of rice protein consists of glutelin which is completely insoluble at pH's generally considered acceptable for infant formula. As a result, formulas made with such protein do not form satisfactory dispersions, have a very grainy, gritty mouthfeel and tend to plug up the nipple.

The prior art noted above principally concerns the production of HPRF and/or rice syrup sweeteners. There are no teachings regarding removal or reduction of phytic acid or undesirable minerals, such as manganese, selenium and aluminum, which are concentrated in the final product during processing of the rice raw material or to provision of solubilized rice protein suitable for sterilized ready-to-use (RTU) formula.

With regards to aluminum, this mineral is present throughout the food chain and it is known that foods of plant origin, including rice, contain higher concentrations of aluminum than bovine or human milk.

Infants with normal kidney function absorb very little dietary aluminum and consequently the amount of aluminum present in infant formula does not appear to present problems. Aluminum that is absorbed is excreted efficiently by the kidneys in these infants. However, patients with impaired kidney function or premature infants with immature kidney function are considered at higher risk of developing aluminum-associated metabolic disorders, including bone disorders, because of a lower than normal ability to excrete systemic aluminum via the kidneys.

Thus, infants at greatest risk of aluminum toxicity include those with impaired renal function, prolonged requirement for parenteral nutrition, and preterm infants with increased need for calcium and phosphorus. An infant formula with reduced aluminum content is preferred for these infants.

With regards to selenium, toxic effects of this mineral in animals and man from excessive intakes were known long before its nutritional effects. As to the latter, selenium is now recognized as an essential trace mineral in both animals and man. Two human selenium deficiency diseases have been described and studied in the People's Republic of China, Keshan and Kaschin-Beck disease. The margin of safety between deficiency and toxicity for selenium intake is narrower than for most other trace elements.

Food constituents are the main source of selenium either through plant or animal protein sources. In general, the food intake of selenium in different parts of the world falls within the range of 20 to 300 mcg per day. The selenium intake of infants is of particular interest because of their rapid growth and increased metabolic requirements. The estimated safe and adequate daily dietary intake of selenium is shown below.

| Estimated Safe and Adequate Daily Dietary Intake Range of Selenium* | | |
|---|---|---|
| Age Group (Years) | | mcg Daily Selenium Intake |
| Infants | 0-0.5 | 10-40 |
|  | 0.5-1.0 | 20-60 |
| Children | 1-3 | 20-80 |
|  | 4-6 | 30-120 |
| Adolescents & Adults |  | 50-200 |

*U.S. National Academy of Sciences, National Research Counsel (1980), Recommended Dietary Allowances, Food and Nutrition Board, Committee on Dietary Allowances, Washington, DC, p.195.

The amount of selenium in rice is dependent on the region where it is grown. Thus, it is prudent to generally reduce the levels in processed rice used for the preparation of infant formula. The process technology for the preparation of soluble rice protein described in this patent application provides about a 25-30% reduction in the amount of selenium associated with the protein thereby minimizing the risk of the selenium content being higher than the recommended safe and adequate range.

Phytic acid (hexaorthomonophosphate ester of myo-inositol) is the principal storage form of phosphate and is ubiquitously distributed in plants, particularly in cereal grains (including rice) and legumes. It is known that under certain conditions, phytic acid in the diet may decrease the absorption of dietary minerals such as zinc, calcium, magnesium and iron.

Phytic acid is not present in human milk or cows milk based infant formula but is found in soy-based formula. Lonnerdal, et al., Am J Clin Nutr 1988; 48:301-6, showed that low bioavailability of zinc from soy formula compared to cow milk formula is a function of its phytic acid concentration and can be overcome by the removal of phytic acid.

Since the phytic acid content of rice is nearly as high as soy on a protein basis, it is important to reduce the phytic acid level of rice-based infant formula. However, the prior art has not addressed the problem of phytic acid reduction in rice flour processing. The process technology for the preparation of soluble rice protein described in this patent application reduces the phytic acid content to extremely low levels.

With regards to manganese, applicants' Puski, et al. U.S. Pat. No. 4,830,861 patent which issued May 16, 1989 (incorporated herein by reference) describes a process for preparing HPRF with safe and adequate manganese levels for infants from commercially available rice flour which typically contain about 150-260 micrograms (mcg) manganese per gram protein.

In the conventional prior art processes involving gelatinization and enzymatic digestion of rice flour, along with increased protein content there is a concomitant enrichment of manganese to a level substantially greater than what is considered safe and adequate for daily dietary intake. Apparently, the manganese associates with the protein and remains with the separated HPRF rather than the solubilized saccharides.

While manganese is considered an essential element in the mammalian diet, it is also known that only relatively small quantities are required by human infants. Human milk levels are generally below 32 micrograms per quart and pediatric nutritionists favor infant formula with relatively low manganese levels. The National Academy of Sciences-Food and Nutrition Board (NAS-FNB) has determined the U.S. average daily intake and the estimated safe and adequate daily dietary intake as follows.

| Dietary Intake | |
|---|---|
| U.S. Avg. Daily Intake | |
| Infants | 10-300 mcg/day |
| Children, 3-5 yrs. | 1,400 mcg/day |
| Children, 10-13 yrs. | 2,180 mcg/day |
| Adults | 2,500-9000 mcg/day |
| Estimated Safe and Adequate Daily Dietary Intake | |
| Infants 0-6 months | 500-700 mcg/day |
| Infants 6-12 months | 700-1000 mcg/day |
| Children and Adolescents | 1,000-3,000 mcg/day |
| Adults | 2,500-5,000 mcg/day |

A quart of infant formula typically contains about 14-20 g protein. As previously mentioned, the HPRF of the prior art retains substantially all of the manganese present in rice flour which has typical manganese levels of 150-260 micrograms per gram protein. Thus, the amount of manganese in a quart of rice protein based infant formula containing 14 and 20 grams protein is calculated as follows for particular levels of rice flour manganese.

| Manganese Per Quart Formula From Rice Flour (grams protein × mcg manganese per gram) | | |
|---|---|---|
| Manganese Content of Rice Flour | Micrograms Manganese per Quart | |
| (mcg/g Protein) | 14 g protein/qt. | 20 g protein/qt. |
| 150 | 2100 | 3000 |
| 260 | 3640 | 5200 |

With the assumption that an infant's diet includes one quart of formula per day, rice flour as a source of protein can contain a maximum of about 50 mcg of manganese/g protein (estimated maximum safe and adequate daily dietary manganese intake of 700 mcg/day for infants 0-6 months divided by 14 grams of protein). Consequently, rice flours cannot be used to make HPRF suitable for infant formula without reduction of manganese since they contain considerably more manganese as illustrated in Table I below.

TABLE 1

| Manganese Content of Commercial Rice Flours | |
|---|---|
| Source | Manganese, mcg/g Protein |
| Riceland Foods[a] | 150-163 |
| California Rice Growers Association[b] | 150-200 |
| Riviana Rice Flour[c] | 150-250 |
| Coor's rice flour[d] | 220-260 |

[a]Stuttgart, AR
[b]Sacramento, CA
[c]Houston, TX
[d]ADM Milling, Rice Div., Weiner, AR The process of Puski, et al., U.S. Pat. No. 4,830,861 provides HPRF with substantially reduced manganese by:
(1) blending rice flour and water at a pH of 3.4 to 4.6,
(2) separating the insoluble washed rice flour,
(3) resuspending the washed rice flour and adjusting to a pH suitable for an alphaamylase enzyme,
(4) treating with an alpha-amylase enzyme for a sufficient time to hydrolyze the starch to about 5-50 dextrose equivalents (DE),
(5) adjusting mixture to pH of 3.4-4.6,
(6) separating the rice syrup from the insoluble low manganese HPRF.

The insoluble low manganese high protein rice flour is suitable as a basic ingredient for foodstuffs but further processing is required to provide dispersibility and mouthfeel characteristics appropriate for use in infant formula. This is carried out by:
(7) treating the low manganese HPRF with a proteolytic enzyme to hydrolyze 1 to 5% of the peptide bonds,
(9) inactivating the enzymes with heat at 70°-80° C.

The protease treated low manganese HPRF is spray dried to provide a modified HPRF containing 50 mcg or less manganese per gram protein. This relatively insoluble low manganese HPRF is suitable for powdered infant formula but cannot be used to make sterile liquid infant formula products. When retorted formula was prepared with low manganese HPRF, the resulting product was very grainy with a gritty mouthfeel after sterilization and poor storage stability which resulted in an unacceptable shelf life.

It is generally known in the art that rice protein is relatively insoluble in aqueous solutions. It is also common knowledge that digestibility of rice flour is low compared to milk protein or soy protein isolate. This may be due to the low solubility of rice protein. A reliable "in vitro" method for determining digestibility of rice protein was published by Bradbury, et al. (1984) Br. J. Nutr. 52: 507-13. The first step of this technique is digestion by pepsin at pH 1.5 at 37° C. for 3 hours. The second step is digestion with a mixture of pancreatic enzymes at pH 8.2 at 37° C. for 16 hours. Using this procedure, cooked rice had an "in vitro" digestibility of about 77%. MacLean (1978) J. Nutr. 108: 1740-47 demonstrated that apparent nitrogen digestibility in children 12-18 months old ranged from 52-78% with cooked rice. Thus, it is evident that cooked rice, as measured by "in vitro" and "in vivo" techniques, has low digestibility. With respect to rice in infant formula or nutritional products, a highly digestible rice protein is desirable and provision thereof is provided by the instant invention.

SUMMARY OF THE INVENTION

According to the invention, there is provided a process for preparing soluble rice protein concentrate with improved digestibility and with substantially reduced content of manganese, aluminum, selenium and phytic acid relative to the content in rice (protein basis) which includes the steps of:
digesting a slurry of the raw material with an alpha-amylase enzyme to solubilize the rice starch;
heating the rice slurry at elevated temperature;
separating the solubilized rice carbohydrate from the insoluble rice protein;
treating a slurry of the insoluble rice protein with a protease enzyme; and
separating the soluble rice protein from the insoluble rice material to provide a soluble rice protein concentrate with improved digestibility and low manganese, aluminum, selenium and phytic acid content.

The soluble rice protein concentrate of this invention can be used as the protein source in liquid or powdered infant formula.

It is a primary objective of the present invention to provide soluble rice protein appropriate for use in shelf stable ready-to-use (RTU) or concentrate infant formula.

A further object of the present invention is to provide soluble rice protein concentrate (SRPC) with improved digestibility and relatively low levels of manganese, aluminum, selenium and phytic acid which can be used in infant formula.

The SRPC of the invention is characterized in
a protein content greater than 16%, preferably 16 to 90% protein on a solids basis,
a manganese content 50 micrograms or less per gram protein,
an aluminum content less than 15 microgram per gram protein,
a selenium content reduced a minimum of 25% on a protein basis relative to the starting rice raw material,
a phytic acid content less than 15 mg per gram protein and preferably less than 5 mg per gram protein, and
a protein digestibility of greater than 90%.

Another object is to provide a process for producing a SRPC with reduced levels of manganese, aluminum, selenium, phytic acid and improved digestibility relative to the rice raw material.

A further object of the invention is to provide a ready-to-use nutritionally complete rice based infant liquid formula using the instant SRPC as protein. For a formula containing 14 g protein per quart, desirable levels of trace minerals and phytic acid are less than 700 micrograms of manganese, less than 210 micrograms of aluminum and less than 40 micrograms of selenium and phytic acid content of less than 210 milligram per quart.

DETAILED DESCRIPTION OF THE INVENTION

Figure 1:
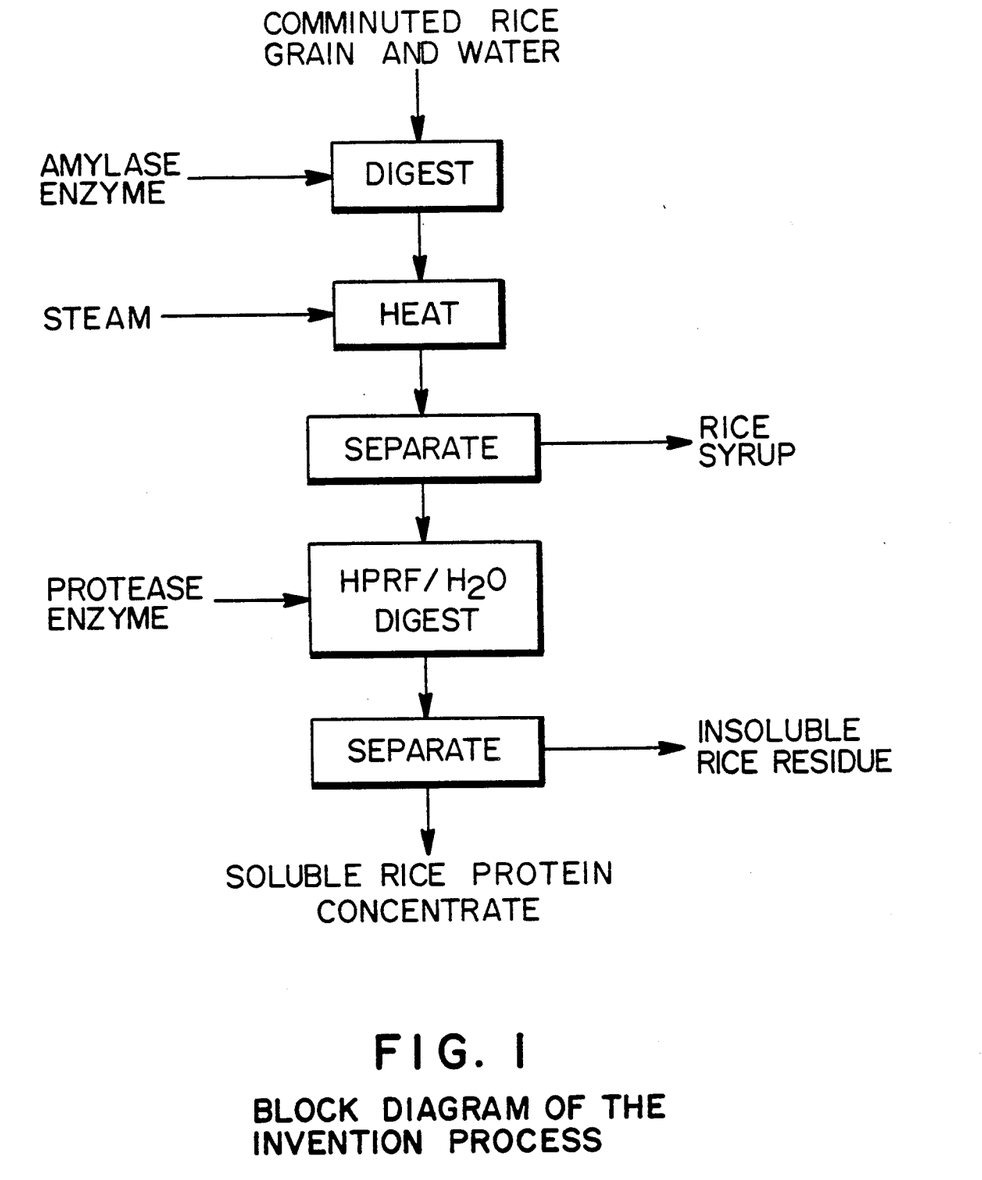
FIGURE 1 is a block diagram illustrating preparation of soluble rice protein concentrate according to the invention.

All forms of rice such as whole grain, broken rice, brewers rice, rice grits and rice flour can be used as raw material in the instant process for preparing soluble rice protein concentrate (SRPC) with improved digestibility and reduced manganese, aluminum, selenium and phytic acid content. Brewers rice is particularly preferred because of its availability and relatively low cost compared to whole grain and broken rice. Detailed discussion of process steps follow and for purposes of the instant specification and claims, the following terms are defined.

High protein rice flour (HPRF)—insoluble material prepared by partial removal of soluble rice carbohydrate and containing greater than 16% insoluble protein without removal of trace minerals and phytic acid.

Low manganese HPRF—high protein rice flour containing less than 50 mcg manganese per gram protein.

Rice syrup—water soluble rice carbohydrate.

Soluble rice protein concentrate (SRPC)—soluble rice solids prepared by the instant invention having a least 16% rice protein with reduced trace minerals and phytic acid and with improved digestibility.

Insoluble rice residue (IRR)—insoluble fraction remaining after separation of SRP from protease treated HPRF.

In accordance with the invention, there is provided a process for preparing SRPC from rice comprising:

(a) digesting the raw material reduced in particle size to permit efficient enzyme action in an aqueous medium with an alpha-amylase enzyme at an operable pH and temperature for a period of time sufficient to solubilize a substantial portion of the rice starch and form a liquid slurry;

(b) heating the slurry at elevated temperatures, e.g. 105° C. to 130° C. for 30 to 60 seconds;

(c) separating HPRF from the rice syrup;

(d) a slurry of the HPRF with a protease enzyme at an operable pH and temperature in an amount and for a period of time to solubilize rice protein;

(e) separating the solubilized rice protein from insoluble rice residue to provide a soluble rice protein concentrate with improved digestibility and reduced manganese, aluminum, selenium and phytic acid content.

The initial step of the instant process requires preparation of an aqueous slurry of the rice starting raw material. As mentioned above, all forms of rice grain can be used for this purpose with brewers rice, defined as rice particles that pass through a sieve with 1.4 mm round perforations, particularly preferred for economic reasons. The only restriction is that the rice raw material should be sufficiently comminuted to maximize the effective surface area exposed to the enzyme. The rice raw material can be milled to the desired particle size prior to dispersion in water or wet ground during processing. As long as a pumpable slurry is provided, the amount of water used is not particularly critical. However, a rice-water weight ratio of about 1:4 is preferred since this ratio provides a sufficient level of solids in the syrup for economic processing and the SRPC can be readily incorporated in infant formula.

In step (a), digestion of the rice raw material is conventionally carried out by using a thermostable alpha-amylase enzyme such as Termamyl (Novo Laboratories, Inc., Wilton, CT) or Takalite (Miles, Inc., Elkhart, IN). An appropriate base or acid can be used to adjust the pH of the slurry within the optimal range of the enzyme, generally about 5.5–9.0. In a preferred embodiment, digestion is conducted at the pH of the rice slurry (pH 6.2) thereby minimizing processing steps and process-added minerals required for pH adjustment and neutralization. The amylase digestion is preferably carried out at 90°–95° C. for 40 min. in the presence of free calcium at a level of 100 ppm to improve amylase heat stability. Suitable enzyme levels depend on source of enzyme, temperature, time, pH and other process conditions. For example, Takalite L-340 can be used at a concentration of 0.34% of rice solids at 90° C. and pH 6.2 for 40 minutes.

As will be appreciated by those skilled in the art, lower temperatures may be used as long as a rice gelatinizing temperature of about 65°–70° C. is reached. Further, digest time can be varied depending on enzyme activity and the degree of starch hydrolysis required.

In the process of the invention, the aqueous mixture of enzyme and rice raw material is held for a period sufficient to hydrolyze the rice starch to 5–50 dextrose equivalent (DE), preferably to 20–30 DE, desired for the instant infant formula. DE constitutes a measure of the total reducing power of the carbohydrate relative to dextrose. At 5–50 DE, the rice starch has been sufficiently hydrolyzed (i.e. solubilized) to provide (on separating the mixture) high protein rice flour having a protein level of 16% or above on a solids basis. Preferred protein levels are 16% to 60% although protein levels approaching 90% to 100% can be achieved with increased water to rice ratios and wash steps. The relationship of digest time to DE is shown in Table 2 below.

TABLE 2

| Effect of Digestion Time on Amylase Digest Dextrose Equivalent* | |
|---|---|
| Time (minutes) | DE |
| 20 | 18 |
| 40 | 21 |
| 60 | 24 |
| 80 | 26 |

*Takalite L-340 at 0.34% of the rice solids at 90° C. and pH 6.2.

Following gelatinization and digestion of the rice raw material in step (a), the amylase digest is heated at elevated temperature, e.g., in the range of 105° C. to 130° C. for 30–60 seconds and 110° C. to 120° C. for 40–50 seconds. As will be appreciated by those skilled in the art, elevated heat treatment can be achieved by alternative time and temperature combinations with a shorter time generally required for higher temperatures and a longer time for lower temperatures. Direct steam injection (DSI) can be used for the heat treatment. In addition to inactivating the amylase enzyme, the heat treatment surprisingly provides a substantial increase in the protein yield of the soluble rice protein concentrate product compared to the yield of product made without this additional heat treatment.

After the heat treatment of step (b), the rice syrup is separated from the insoluble HPRF by conventional means such as centrifugation, filtration, or decantation. The HPRF thus obtained contains essentially all of the minerals present in the rice raw material and in that respect is similar to the HPRF of the prior art.

Next, the heat modified HPRF of step (c) is solubilized with protease enzymes. The enzymatic protein hydrolysis is carried out by first adding sufficient water to the insoluble HPRF fraction to provide a pumpable slurry with adjustment of pH and temperature in accord with the operable range of the particular protease enzyme. General process conditions include diluting the heat modified HPRF fraction to about 14% total solids or in the range 10-20% on a w/w basis, heating the HPRF slurry to about 40°-60° C. and adjusting the pH with a suitable base such as sodium or potassium hydroxide to about 6.5-9.0.

Proteolytic enzymes from various sources including those of fungal, bacterial, plant and animal origin can be used individually or in combination in the instant process. Pancreatin is a particularly preferred enzyme in that it provides relatively high protein yields, is readily available (Biocon, Inc. Lexington, KY; American Laboratories, Inc., Omaha, NE) and has exceptionally high protease activity per unit cost.

Combinations of enzymes such as Protease N and Prozyme 6 (Amano International Enzyme Co., Inc., Troy, VA) constitute an operable alternative enzyme system. For example, the combination of Protease N at about 0.5% and Prozyme 6 at about 2.2% of protein substrate solubilizes more rice protein than either enzyme alone at the same or higher concentration.

If pancreatin is used, the mixture is typically heated to 50° C. and the pH adjusted to 8.0 with an alkali such as potassium hydroxide, calcium hydroxide, or sodium hydroxide. During digestion, additional alkali, e.g., KOH, is added to maintain pH 8 for 10 to 20 min. At this time the pH is permitted to drop to a final pH of about 6.9 to 7.5. The amount of base used is controlled to provide a suitable potassium content in the SRPC product for use in infant formula. An alternative to the above is to employ calcium hydroxide to maintain pH 8 during digestion and subsequently adjusting to pH 6.5 to 7.5 with an acid such as phosphoric. Typically, pancreatin with activity of 200 NF units/mg (8X USP) at a level of 1% to 4% of the protein substrate is employed.

For pancreatin digests, the temperature influences the percent of rice protein solubilized and the percent α-amino nitrogen content of the soluble rice protein concentrate. The results in Table 3 show that acceptable protein solubility can be achieved throughout the temperature range studied (35°-60° C.). However, the preferred temperature range for rice protein solubilization and hydrolysis is from 40° C. to 55° C. For microbiological reasons, the optimum operation temperature is at the higher end of the preferred temperature range.

TABLE 3

| Effect of Protein Digest Temperature on Protein Solubilization and Hydrolysis | | |
|---|---|---|
| Digest Temperature (°C.) | Protein Solubilized (%) | SRPC α-Amino Nitrogen Content (%) |
| 35 | 72.0 | 22.0 |
| 40 | 75.5 | 23.1 |
| 45 | 75.8 | 26.4 |

TABLE 3-continued

| Effect of Protein Digest Temperature on Protein Solubilization and Hydrolysis | | |
|---|---|---|
| Digest Temperature (°C.) | Protein Solubilized (%) | SRPC α-Amino Nitrogen Content (%) |
| 50 | 75.5 | 27.9 |
| 55 | 74.4 | 27.4 |
| 60 | 71.4 | 23.1 |

Protease digestion is carried out for a period of 1 to 5 hours while maintaining the incubation temperature and pH conditions as noted above. The relationship of digest time and protein solubilization for a 2% pancreatin level is shown in Table 4 below.

TABLE 4

| Effect of Protease Digestion Time on Protein Solubilization and Hydrolysis | | |
|---|---|---|
| Time (hours) | Protein Solubilized (%) | SRPC α-Amino Nitrogen Content (%) |
| 1 | 69.1 | 25.4 |
| 1.5 | 70.6 | 27.5 |
| 2 | 72.2 | 28.8 |
| 3 | 74.5 | 29.6 |
| 4 | 75.2 | 30.2 |
| 5 | 76.5 | 30.9 |

It is evident that most of the protein solubilization takes place the first hour with relatively little additional hydrolysis occurring after three hours.

As expected, the rate of digestion is also dependent on the level of protease used relative to the protein content of the digest. Pancreatin enzyme results are shown in Table 5 below. The ratio of pancreatin to rice protein is described on a percent weight of pancreatin to weight of protein. The results show that levels of pancreatin ranging from 1 to 2.5% provide satisfactory protein solubilization. The results in Table 5 also show that the α-amino nitrogen increases as the pancreatin to protein ratio increases from 1 to 2.5%. Since maximum protein solubilization is preferred, the pancreatin level of 2% on a protein basis was used to study the variables that influence protein solubilization as shown in Tables 3 and 4.

TABLE 5

| Effect of Pancreatin Use Level on Rice Protein Solubilization and Hydrolysis | | |
|---|---|---|
| Enzyme-protein Ratio (%, w/w) | Protein Solubilized (%) | SRPC α-Amino Nitrogen Content (%) |
| 1.0 | 71.2 | 24.5 |
| 1.5 | 74.0 | 26.5 |
| 2.0 | 75.5 | 27.9 |
| 2.5 | 75.2 | 29.3 |

When pancreatin digestion of HPRF is complete, the protein digest is heated at 85°-90° C. for 10 minutes to inactivate the protease and the insoluble fraction is removed by centrifugation or other suitable means. At the digest pH, the soluble rice protein concentrate contains low levels of undesirable trace minerals and phytic acid while the insoluble fraction contained relatively high levels of these undesirable substances. Thus, the process of the instant invention removes undesirable trace minerals and phytic acid from rice starting material to produce a soluble rice protein fraction that is appropriate for use in infant formula.

The final separation step (e) is particularly critical to the instant process. At this step, substantial amounts of undesirable minerals and phytic acid are retained in the insoluble rice residue leaving the SRPC with reduced levels of manganese, aluminum, selenium and phytic acid appropriate for infant formula. Preferably, this separation is carried out with pH control between 6 and 8 for effective removal of manganese and phytic acid from the SRPC. As the separation pH is reduced to pH 5 or below, the reduction of manganese and phytic acid in the soluble rice protein concentrate is considerably less efficient. These compounds tend to remain in the soluble fraction after separation at low pH as shown in Table 6 below. As to selenium, the amount removed relative to the rice raw material is a minimum of about 25% and is not appreciably influenced by the separation pH.

TABLE 6

The Manganese and Phytic Acid Content of High Protein Rice Flour and Soluble Rice Protein Concentrate Using Various Digest Separation pH's

| Sample | Manganese mcg/g protein | Phytic Acid mg/g protein |
|---|---|---|
| SRPC pH 7.65 | 5.6 | 0.8 |
| SRPC pH 7.5 | 4.9 | — |
| SRPC pH 7.0 | 11.1 | 2.1 |
| SRPC pH 6.0 | 33.4 | — |
| SRPC pH 5.0 | 151 | 19.1 |
| SRPC pH 3.0 | 226 | 14.9 |
| HPRF — | 196 | 22.5 |

Separation at a high pH level is not recommended because of browning and other undesirable reactions.

In order to maximize protein yields, the insoluble solids obtained from the separated SRPC can be washed with water to provide a second SRPC fraction. In a typical example, the insoluble rice residue was diluted with tap water to 6% w/w total solids and centrifuged. The second fraction of soluble protein concentrate had about 0.9% protein and was combined with the first fraction of soluble protein concentrate at 4.4% protein to provide a concentrate with 3.1% protein and an overall protein yield of 69%.

Tables 7 and 8 below show a representative comparison of protein, carbohydrate, fat, ash, trace minerals and phytic acid content of unprocessed rice flour, high protein rice flour, brewers rice and soluble rice protein concentrate of the instant invention. It is evident that compared to HPRF, SRPC has substantially reduced levels of all trace minerals and phytic acid.

TABLE 7

Soluble Rice Protein Concentrate (SRPC) Composition Compared to Rice Flour and High Protein Rice Flour (HPRF)[a]

| Composition | Rice Flour | HPRF | SRPC |
|---|---|---|---|
| Protein % w/w | 9.0 | 25.0 | 37.0 |
| Carbohydrate[b] % w/w | 84.4 | 68.9 | 50.5 |
| Fat % w/w | 0.4 | 4.1 | 2.0 |
| Ash, % w/w | 6.6 | 1.1 | 10.5 |

[a]Hansen, et al. supra.
[b]By difference

TABLE 8

Comparison of Trace Minerals and Phytic Acid Content of HPRF and SRPC Prepared From Samples of Brewers Rice

| | Sample | Brewers Rice | HPRF | SRPC |
|---|---|---|---|---|
| Manganese mcg/g protein | 1 | 210 | 190 | 12.4 |
| | 2 | 180 | 200 | 7.2 |
| | 3 | 230 | 230 | 7.1 |
| Aluminum mcg/g protein | 1 | 53 | 40.1 | not detectable |
| | 2 | 370 | 282 | 15 |
| | 3 | 65 | 31 | not detectable |
| Selenium mcg/g protein | 1 | 3.8 | 3.5 | 2.3 |
| | 2 | 2.1 | 2.1 | 1.4 |
| | 3 | 2.6 | 1.8 | 1.9 |
| Phytic Acid mg/g protein | 1 | 23.6 | 20.7 | 0.8 |
| | 2 | 24.1 | 20.1 | 0.7 |
| | 2 | 24.9 | 23.2 | 1.0 |

The instant invention produces a soluble rice protein concentrate that also has highly digestible protein. The results in Table 9 below show that "in vitro" digestibility of SRPC is about 96% while low Mn HPRF is 81%. It is also evident that the protein with lower digestibility is concentrated in the IRR. The protein in SRPC with high digestibility is desirable for use in infant formula products.

TABLE 9

"In Vitro" Digestibility of Rice Protein Samples

| | No. of Samples | % Digestibility |
|---|---|---|
| Rice Flour | 6 | 87.8 ± 3.6 |
| Low Mn HPRF[a] | 13 | 81.4 ± 3.5 |
| SRPC | 12 | 95.7 ± 3.9 |
| IRR | 3 | 64.7 ± 5.7 |

[a]Puski, et al. U.S. 4,830,861

The soluble rice protein concentrate can be used as is or after drying to formulate nutritional products. A typical RTU formulation using SRPC is shown in Table 10 below. This product was formulated at 20 kcal per fluid oz. and contains 12 mg. iron per quart. The composition of this product is 1.7% protein, 3.54% fat, 0.39% ash, 6.76% carbohydrate and 12.39% total solids calculated on a w/w basis.

TABLE 10

SRPC Based Infant Formula, 20 kcal per fluid oz, 12 mg Iron per quart

| Ingredient | Amount |
|---|---|
| SRPC (40.2T Protein, 55.4% CHO, 4.4% Ash) | 408.5 gm |
| Rice syrup solids (98.3% CHO, 1.3% Ash) | 431.64 gm |
| Fat blend (55% Coconut, 45% soy) | 353.73 gm |
| Emulsifiers | 11.00 gm |
| Calcium hydroxide | 4.47 gm |
| Potassium phosphate, monobasic | 2.86 gm |
| Sodium phosphate, Monobasic | 2.97 gm |
| Citric acid | 7.36 gm |
| Calcium chloride | 6.69 gm |
| Sodium citrate | 3.13 gm |
| Magnesium chloride | 1.97 gm |
| Ferrous sulfate | 0.64 gm |
| Dry vitamin premix | 2.14 gm |
| Vitamin ADEK concentrate | 0.32 gm |
| L-Lysine | 4.27 gm |
| L-Threonine | 1.48 gm |
| Trace mineral premix | 0.17 gm |
| Water | 8757.18 gm |
| TOTAL | 10000.01 gm |

As previously mentioned, levels of manganese, aluminum, selenium and phytic acid provided by the SRPC of this invention are appropriate for infant formula. In this regard, the preferred level of manganese is less than 50 microgram per gram protein. For aluminum, the preferred level is less than 15 microgram per gram protein. For selenium, the preferred level is less than 3.0 microgram per gram protein. For phytic acid, the preferred level is less than 15 milligram per gram protein and most preferably less than 5 milligram per gram protein.

The process and products of this invention are illustrated by the following examples which are not to be construed as limiting the invention in sphere or scope.

EXAMPLE 1

Effect of Amylase Digest Heat Treatment on SRPC Yield

This example illustrates that heat treatment of amylase digest substantially improves the protein yield of the soluble rice protein concentrate.

A slurry of brewers rice (2.4 kg), calcium chloride (3.36 g) and Takalite L-340 (8.25 g) in water (9.6 kg) was heated at 90°–95° C. for 60 min. to allow the thermostable amylase to digest and hydrolyze the starch in the brewers rice. Following amylase treatment, the digest was heat treated at 107° C. for 45 seconds by direct steam injection (DSI). The resulting DSI treated digest, containing about 18% solids, was flash cooled to about 75°–85° C. and centrifuged with an International Centrifuge, CRU-5000, 276 rotor at 2300 rpm for 12 minutes. The insoluble HPRF pellet contained about 28.5% solids (having had a 41.8% protein content) while the carbohydrate supernatant contained 17.7% solids.

A 980 g portion of HPRF pellet was diluted to 2000 g with double distilled water and the slurry heated to 45°–50° C. and adjusted to pH 8.0 with 8.3 g of 20% potassium hydroxide. Pancreatin 8X, (American Laboratories, Inc.) was added at a level of 2.3 g (2% enzyme on a protein basis) with the pH of the slurry maintained at 8.0 with calcium hydroxide during a 5 hr. digestion period. The pH is reduced to 6.5 with phosphoric acid and the digest heated at 85°–90° C. for 10 minutes to inactivate the enzyme. The protease digest was cooled to 25°–35° C. and then fractionated into a soluble protein fraction and an insoluble protein fraction by centrifugation with a Sorvall centrifuge GS-3 rotor at 5000 rpm for 30 min. After washing the insoluble rice residue with 800 mL double distilled water and centrifuging a second time, the combined supernatant fractions weighed 2561 g and had a 3.4% protein and 9.0% solids content. Based on the protein content of the HPRF, the protein yield of the solubilized rice concentrate was about 75%. The soluble rice protein concentrate can be used as a protein source in infant formula products. The infant formula can be prepared from liquid concentrate or spray dried rice protein concentrate. Relative to brewers rice, the soluble rice protein concentrate contained low levels of undesirable trace minerals. These minerals are concentrated in the insoluble rice residue fraction.

When the process was carried out with heat treatments that ranged from 107° C. to 127° C. for 45 sec. the yields and the amount of protein solubilized were comparable. However, when no heat treatment or 96° C. for 45 sec. was used prior to the protease digestion step, the solubilization of protein was much lower. Results of these studies are shown in Table 11.

TABLE 11

| Effect of Heat Treatment of Amylase Digest on Protein Solubility | | |
|---|---|---|
| Heat Treatment | 3 hr. Digestion | 5 hr. Digestion |
| 96° C. for 45 sec. | 61.6% | — |
| 107° C. for 45 sec. | 76.2% | 80.2% |
| 118° C. for 45 sec. | 77.2% | 81.1% |
| 127° C. for 45 sec. | 77.2% | 78.0% |
| None | 58.4% | 60.9% |

EXAMPLE 2

Preparation of Soluble Rice Protein Concentrate Using High Protein Rice Flour at 19% Solids Level A 400 g batch of HPRF pellet prepared according to Example 1 was added to 510 g deionized water at 50° C. followed by 2.3 g of Pancreatin 8X. Additional HPRF (580 g) was then added to the digestion mixture increasing the solids level to 19%. The pH of the mixture was adjusted and maintained at 8.0 until 32 g of 20% KOH and 3.6 g of 50% NaOH was added. After digestion for 3 hr. (pH dropped to 7.5), the pH was adjusted to 6.9 with 85% $H_3PO_4$ and the mixture heated at 85°–90° C. for 10 min. to inactivate the protease.

The mixture was cooled to room temperature and separated by centrifugation with a Sorvall GS-3 centrifuge rotor at 6,000 rpm for 20 min. The insoluble rice residue was washed with 1600 g of deionized water and supernatant combined with the first soluble fraction. The total protein yield was 67.2%.

This example illustrates that the solids level of HPRF subjected to protease treatment according to the process of the invention can be varied.

EXAMPLE 3

Preparation of Soluble Rice Protein Concentrate Using Bacterial, Plant, or Fungal Proteases Alkaline Bacterial Protease—Deionized water was added to a 490 g batch of HPRF (28.5% solids) prepared according to Example 1 to provide a total mixture of 1000 g which was heated to 50° C. The pH of the mixture was adjusted to 8.0 with 3.8 g 20% KOH and the protease Alcalase (Novo, Wilton, CT), 1.8 g, then added. The pH was maintained at 8 for the first 1.5 hrs. of the digestion which required addition of 16.2 g of 20% KOH to the mixture. After a 3 hr. digestion period, the final pH of the reaction dropped to 7.6. The pH was then adjusted to 7.1–7.2 with citric acid and the mixture heated at 85°–90° C. for 10 min., cooled to room temperature and centrifuged using a Sorvall GS-3 centrifuge rotor at 6,000 rpm for 20 min. The residual pellet was washed with 400 g distilled water and recentrifuged. Based on the protein content of the HPRF, the protein yield after the first centrifugation was 41.5% and after the second centrifugation a total protein yield was 47%.

Neutral Bacterial Protease—Protein solubilization of HPRF was carried out as above with 1.8 g of Neutrase (Novo, Wilton, CT) added to the mixture and the pH was maintained at 7.0 for the 3 hr. digestion period. The total protein yield was 33.5%.

Plant Protease—Protein solubilization of HPRF was carried out as above with 0.3 g of papain (Miles, Elkhart, IN) added to the mixture with the pH maintained at 7.0 at 60° C. for the three hour digestion period. The protein yield was 17%.

Neutral Fungal Protease—Protein solubilization of HPRF was carried out as above with 1.2 g of Prozyme 6 (Amano International Enzyme Co., Inc., Troy, VA) added to the mixture. The protein yield was 61%.

This example illustrates that various types of proteases can be used in the process of this invention.

EXAMPLE 4

Preparation of Soluble Rice Protein Concentrate Using a Protease Mixture

Deionized water was added to a 490 g batch of HPRF (27.2% solids containing 42.4% protein) prepared according to Example 1 to provide a 1000 g mixture which was adjusted to pH 7.0 with 4.1 g of 20% KOH and heated to 45° C. Then 1.2 g of Prozyme 6 and 0.3 g of Protease N (Amano International Enzyme Co., Inc., Troy, VA) was added to the digest. The pH was maintained at 7.0 over the 3 hr. digest period with 13.5 g of 20% KOH until the base was exhausted. The digest was heated to 85°–90° C. for 10 minutes, cooled, centrifuged, and the insoluble portion washed as in Example 3. The protein yield after the first centrifugation step was 68.0% and the combined yield after washing was 73.6%.

This example illustrates that a combination of two enzymes is effective in solubilization of rice protein.

EXAMPLE 5

Preparation of Soluble Rice Protein Concentrate on a Pilot Plant Scale

Fifty pounds of rice flour and 40 g of Takalite L-340 amylase enzyme were dispersed in 200 pounds of water in a 50 gallon jacketed tank. The slurry was heated to 91° C., held for 20 min. and then heat treated at 118° C. for 45 seconds. The mixture was cooled to 66° C. and centrifuged with a Sharples 660 at a bowl speed of 6200 rpm and back drive of 4200 rpm (product flow rate of 0.5 gpm). The HPRF was collected and cooled with chilled water. This procedure was repeated 5 times. Dextrose equivalents of the rice syrup supernatant ranged from 18–21.

The HPRF from the six batches was combined and adjusted to 14% total solids with water and the mixture heated to 50° C. and adjusted to pH 8.0 with 30% KOH prior to the addition of 192 g of pancreatin 8X protease enzyme. During a 3 hr. digest period, a total of 2400 g of 30% KOH solution was added to adjust and maintain pH 8.0. At the end of the three hour digestion, the pH was adjusted to 6.5 with phosphoric acid and the mixture heated to 85° C. for 10 min. to inactivate the enzyme and then cooled to 24° C. The mixture was centrifuged with a Westphalia SA-1 at ¼ gpm flow rate with a 3 minute discharge interval. The final soluble rice protein concentrate was stored at 4° C. for use as a protein source in liquid infant formula.

Alternatively, the soluble rice concentrate was further concentrated to 35–40% total solids in an evaporator and then spray dried for use in infant formula.

Table 12 below sets out the protein and solids yield on the HPRF and digest fractions (SRPC and IRR).

TABLE 12

Protien and Solids Yields of HPRF, SRPC and IRR

| Fraction | % Solids Yield | % Protein Yield |
|---|---|---|
| HPRF | 20 | 94 |
| RPC | 15 | 55 |

TABLE 12-continued

Protien and Solids Yields of HPRF, SRPC and IRR

| Fraction | % Solids Yield | % Protein Yield |
|---|---|---|
| IRR | 6 | 32 |

Table 13 below demonstrates that the process of the instant invention provides marked reduction of the manganese found in the insoluble HPRF prior art. Thus, the manganese content of the SRPC was only about 6% that of the HPRF. It is also evident that the manganese found in the HPRF is concentrated in the insoluble rice residue. While aluminum levels in the SRPC product were not detectable, the total aluminum content in the IRR was approximately equal to the total aluminum content in the HPRF indicating that essentially all the aluminum is eliminated from the SRPC by the instant process.

TABLE 13

Trace Mineral and Phytic Acid Content of HPRF, SRPC and IRR

| | Manganese mcg/g Protein | Aluminum mcg/g Protein | Selenium mcg/g Protein | Phytic Acid mg/g Protein |
|---|---|---|---|---|
| HPRF | 131 | 18.8 | 1.8 | 21.5 |
| SRPC | 8.3 | not detectable | 1.4 | 1.1 |
| IRR | 360 | 60 | 2.8 | 35.8 |

EXAMPLE 6

Reduction of Minerals and Phytic Acid

This example demonstrates that in the preparation of soluble rice protein concentrate (SRPC) from brewers rice, the trace minerals and phytic acid content is markedly reduced and is correspondingly concentrated in the insoluble rice residue (IRR).

The rice starch was hydrolyzed with amylase in the first step of the process as described in Example 1. After hydrolysis of the starch with amylase, the digest was heat treated by direct steam injection at 118° C. for 45 seconds, flash cooled and centrifuged in a laboratory International Centrifuge. The resulting HPRF pellet had 28.6% solids which contained 47.1% protein. Deionized water was added to 490 g of the HPRF pellet to make a slurry weighing 1000 g. The slurry was heated to 45°–50° C. and adjusted to pH 8.0 with 4.5 g of 20% KOH. Pancreatin 8X was added at a level of 1.15 g and the digest pH adjusted and maintained at about 8.0 with a total of 11.5 g of 20% KOH which was exhausted after 90 min. of digestion. After three hours of digestion, the final pH dropped to 7.1 and the digest was then heat treated at 85°–90° C. for 10 min. and cooled to 25°–35° C. The soluble rice protein concentrate fraction was obtained by centrifugation in a Sorvall centrifuge with a GS-3 rotor at 6000 rpm for 20 min. The insoluble rice residue fraction was washed with 400 ml of deionized water and recentrifuged. The combined supernates weighed 1173 g and had a solids content of 9.0% and a protein content of 3.6%. The total soluble rice protein yield of the combined supernates was 68.7%.

The process used to prepare soluble rice protein concentrate with low levels of trace minerals and phytic acid also produces a carbohydrate fraction (rice syrup) and an insoluble fraction (insoluble rice residue). Most of the undesirable trace minerals and phytic acid found in the original rice flour remain in the IRR. Table 14 below shows the trace mineral distribution among the rice fractions produced in this example. The dramatic reduction in undesirable trace minerals is noted in the SRPC fraction.

TABLE 14

Trace Mineral and Phytic Acid Content of SRPC, IRR, and Rice Syrup Prepared From Brewers Rice

| | Brewers Rice | SRPC | IRR[a] | Rice Syrup |
|---|---|---|---|---|
| Manganese mcg/g protein | 210 | 12.4 | 600 | 1 |
| Aluminum mcg/g protein | 53 | not detectable | 126 | not detectable |
| Selenium mcg/g protein | 3.8 | 2.3 | 4.8 | 0.02 |
| Phytic Acid mg/g protein | 23.6 | 0.8 | 65 | 0.1[b] |

[a]Typical protein content, 6% w/w.
[b]Solids basis.

EXAMPLE 7

Infant Formula (RTU) prepared from SRPC

This example provides the processing steps needed for preparing 10,000 g batch of RTU infant formula using soluble rice protein concentrate as the source of protein.

The first step is to disperse 408 g of soluble rice protein concentrate solids (40.2% protein, 55.4% CHO) and 431.6 g of rice syrup solids (98.3% CHO) in 5900 g of tap water at room temperature. Then 4.27 g of l-lysine and 1.48 g of l-threonine in 60 g of tap water were added along with 4.5 g of calcium hydroxide in 50 g of tap water. The salts potassium phosphate monobasic (2.86 g), sodium phosphate monobasic (2.97 g) are added together in 60 g of tap water. Then 7.4 g of citric acid and 3.1 g of sodium citrate are dissolved in 100 g of tap water and added to the mixture along with 6.7 g calcium chloride and 2 g magnesium chloride dissolved in 90 g of tap water. Both 0.64 g ferrous sulfate and 0.17 g of trace mineral premix are dissolved in 10 ml of water and added to the mixture.

In the second part of this process the mixture of protein, carbohydrate and minerals is heated to 50°-55° C. The fat blend, consisting of 354 g of a 55% coconut oil, 45% soy oil mixture, 11 g of emulsifiers and 0.32 g of vitamins A, D, E, K, premix concentrate is heated to 60°-70° C. and added hot to the aqueous mixture of protein, carbohydrate and minerals. This mixture is quickly heated to 130° C., held for 45 seconds and immediately cooled to 65°-70° C.

This heat treated mixture is then homogenized (2500/500 psig first and second stage, respectively). It is homogenized a second time at the same pressures and cooled immediately to 2°-5° C. The mix is adjusted to pH 7.4 with a 10% solution of KOH and 2.1 g of vitamin premix is dissolved in 50 ml of tap water and added to the homogenized mixture. The mix is analyzed for solids and adjusted to 12.4% by adding the appropriate amount of tap water. The finished product is packaged and sterilized.

What is claimed is:

1. Soluble rice protein concentrate having a protein content of more than 16% on a solids basis.

2. Soluble rice protein concentrate of claim 1 having a protein content of 16% to 90% on a solids basis.

3. Soluble rice protein concentrate of claim 1 having a manganese content of less than 50 microgram per gram protein.

4. Soluble rice protein concentrate of claim 1 having an aluminum content of less than 15 microgram per gram protein.

5. Soluble rice protein concentrate of claim 1 having a selenium content reduced a minimum of 25% on a protein basis relative to rice raw material.

6. Soluble rice protein concentrate of claim 1 having a phytic acid content of less than 15 milligram per gram protein.

7. Soluble rice protein concentrate of claim 1 having a phytic acid content of less than 5 milligram per gram protein.

8. Soluble rice protein concentrate of claim 1 having protein digestibility of greater than 90%.

9. A process for preparing soluble protein rice concentrate from rice raw material containing manganese, aluminum, selenium and phytic acid consisting essentially of the steps:
    (a) digesting the raw material reduced in particle size to permit efficient enzyme action in an aqueous medium with an alpha-amylase enzyme at an operable pH and temperature for a period of time sufficient to solubilize a substantial portion of the rice starch and form a liquid slurry;
    (b) heating the slurry at 105° C. to 130° C. for 30 to 60 seconds;
    (c) separating the insoluble high protein rice flour fraction from the solubilized rice carbohydrate;
    (d) treating a slurry of the high protein rice flour with a protease enzyme at an operable pH and temperature in an amount and for a period of time to solubilize rice protein;
    (e) separating the solubilized rice protein from insoluble rice residue at pH 6 to 8 to provide a soluble rice protein concentrate with improved digestibility and reduced manganese, aluminum, selenium and phytic acid content.

10. The process of claim 9 wherein the separated soluble rice protein concentrate has a protein content of more than 16% on a solids basis.

11. The process of claim 9 wherein the separated soluble rice protein concentrate has a protein content of from 16% to 90% on a solids basis.

12. The process of claim 9 wherein the separated soluble rice protein concentrate has a manganese content of less than 50 micrograms per gram protein.

13. The process of claim 9 wherein the separated soluble rice protein concentrate has an aluminum content of less than 15 microgram per gram protein.

14. The process of claim 9 wherein the separated soluble rice protein concentrate selenium content is reduced a minimum of 25% on a protein basis relative to rice raw material.

15. The process of claim 9 wherein the separated soluble rice protein concentrate has a phytic acid content of less than 15 milligram per gram protein.

16. The process of claim 9 wherein the separated soluble rice protein concentrate has a phytic acid content of less than 5 milligrams per gram protein.

17. The process of claim 9 wherein the separated soluble rice protein concentrate has a protein digestibility of greater than 90%.

18. The process of claim 9 wherein the rice raw material is hydrolyzed to 5 to 50 DE content.

19. The process of claim 9 wherein the rice starch slurry is heated by direct steam injection.

20. The process of claim 9 wherein the rice starch slurry is heated by direct steam injection at 105°–130° C. for 30–60 seconds.

21. The process of claim 9 wherein the rice starch slurry is heated by direct steam injection at 110° C. to 120° C. for 40–50 seconds.

22. A liquid ready-to-use nutritionally complete infant formula wherein protein is provided by soluble rice protein concentrate having a protein content of more than 16% on a solids basis, a manganese content of less than 50 microgram per gram protein, an aluminum content of less than 15 microgram per gram protein, a selenium content of less than 3 microgram per gram protein, a phytic acid content of less than 15 milligram per gram protein and wherein protein digestibility is greater than 90%.

* * * * *